Oct. 30, 1928.

A. J. A. PETERSON 1,689,840

TRANSFORMER SWITCHING SYSTEM

Filed April 21, 1923

WITNESSES:

INVENTOR

Alfred J. A. Peterson.

BY

ATTORNEY

Patented Oct. 30, 1928.

1,689,840

UNITED STATES PATENT OFFICE.

ALFRED J. A. PETERSON, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSFORMER SWITCHING SYSTEM.

Application filed April 21, 1923. Serial No. 633,670.

My invention relates to switching systems and particularly to unit systems containing a plurality of switching devices that are to be controlled in sequence to perform corresponding operations.

One object of my invention is to provide a switching system for a transformer, or other translating apparatus, in which the switching devices shall be disposed on each side of the transformer and be so interlocked and controlled that actuation of one of the devices will effect a corresponding operation in the other switching device.

Another object of my invention is to provide a switching system containing a plurality of switching devices disposed in different portions of an electrical circuit and means for controlling the devices in sequence to cause each switch, after a predetermined operation, to effect a corresponding operation of the next switching device in the sequence.

In practicing my invention, I dispose a circuit interrupter on the high-tension and low-tension sides of a transformer, or other similar apparatus that is to be protected or controlled, and provide a controlling means therefor whereby closing and opening of the high-tension interrupter will effect similar operation of the low-tension interrupter. In a unit system, comprising an incoming line, a transformer, a bus and a feeder circuit, I provide controlling means whereby the switching device on the high-tension and low-tension sides of the transformer and a switching device between the bus and the feeder circuit may all be controlled in series to effect similar operations in all of the switching devices.

I provide also means responsive to different conditions that may occur within the transformer or the circuit supplying energy thereto whereby the high-tension interrupter may be so controlled as to preclude energization of the windings of the transformer until the abnormal condition has been rectified and the controlling device reset.

The control circuits associated with the respective interrupters are so arranged that, immediately upon closure of the high-tension interrupter, its closing mechanism is deenergized and the closing mechanism of the low-tension interrupter is energized to effect the closure of the latter, whereupon its closing mechanism is also subsequently deenergized. Control devices that are employed to deenergize the closing mechanism of the respective interrupters are reset to permit a subsequent reclosure when the associated interrupters are opened.

Figure 1:
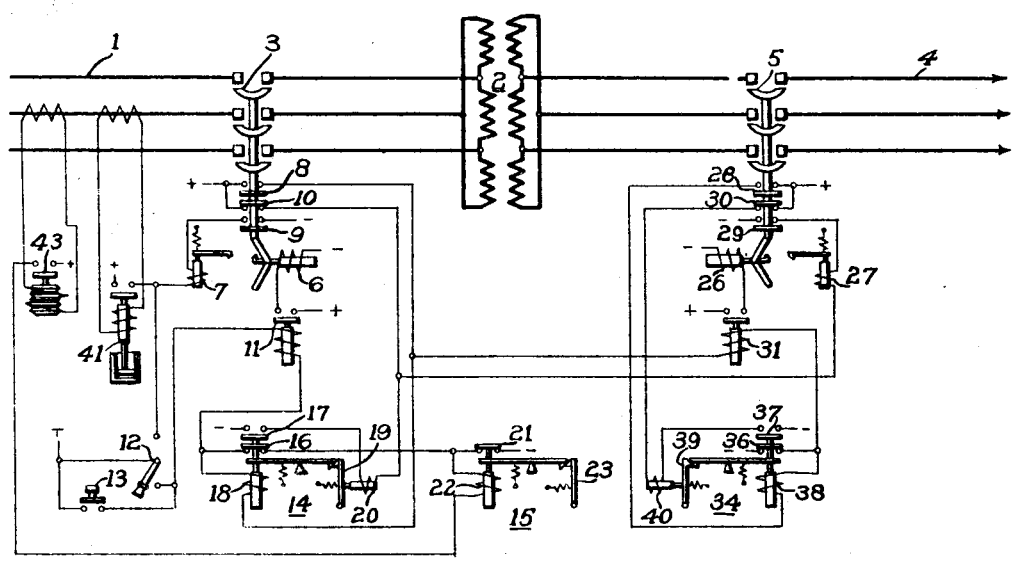
Figure 2:
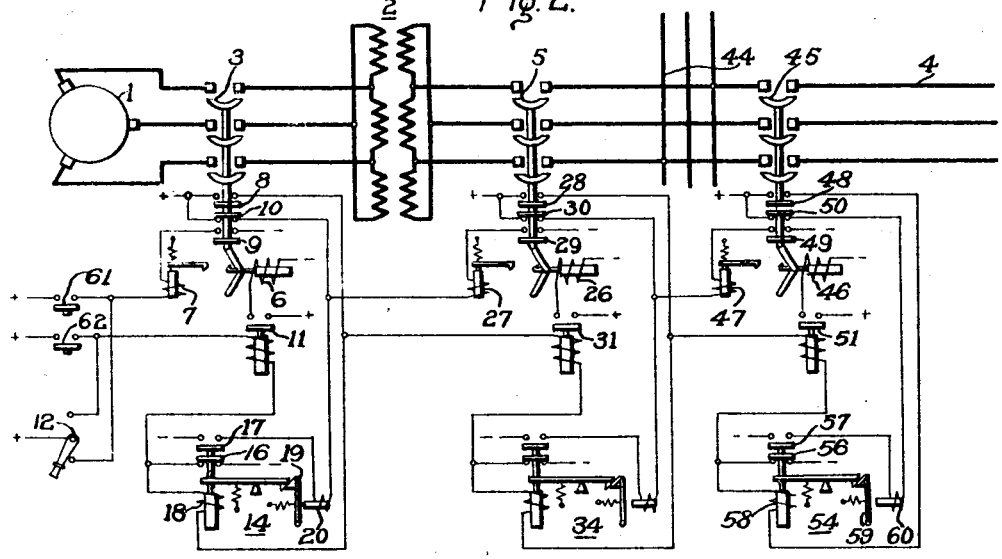

Figure 1 of the accompanying drawing is a diagrammatic view of an electrical circuit containing apparatus arranged to operate in accordance with my invention; and Fig. 2 is a diagrammatic view of a unit circuit system arranged to operate in accordance with my invention.

As illustrated in Fig. 1 of the accompanying drawings, energy from a source 1 of electromotive force is supplied to the high-tension winding of a transformer 2 through a high-tension interrupter or switching device 3 and, after being transformed to energy of lower potential, is supplied to a circuit 4 through a low-tension interrupter 5.

The high-tension interrupter 3 comprises a closing coil 6, a trip coil 7 and two interlock switches 8 and 9 that are closed and an interlock switch 10 that is open when the main contacts of the interrupter 3 are closed.

The circuit of the closing coil 6 is controlled by a relay switch 11 which, in turn, may be controlled either manually, by the operation of a manually-operable switch 12 or automatically in response to any predetermined condition through the operation of an automatically-operated switching device 13. The circuit of the relay 11 is also controlled by a cut-off relay 14 and a lock-out relay 15.

The cut-off relay comprises a main switch 16, that is normally closed, and a switch 17, that is normally open, both of which are actuated from such positions upon the energization of an operating coil 18 and then latched in the biased position of the relay by a latching member 19. The latching member 19 may be actuated by means of a reset coil 20 to permit the resetting of the relay in its initial position.

The lock-out relay 15 is similar in operation to the cut-off relay 14 and comprises a single switch 21, that is normally closed, an operating coil 22 and a latching member 23 which is illustrated as being arranged to be manually reset but which may, however, be arranged to be electrically reset by the addition of a reset coil similar to that provided for the cut-off relay 14.

The low-tension interrupter 5 comprises a closing coil 26, a trip coil 27 and interlock switches 28, 29 and 30 that are in the positions illustrated in the drawing when the interrupter is in its open position. A relay 31 is provided for the circuit of the closing coil and its circuit is controlled by a cut-off relay 34 that is similar in construction and in operation to the cut-off relay 14 associated with the high-tension interrupter 3.

The cut-off relay 34 comprises two switches 36 and 37, an operating coil 38, a latching member 39 and a reset coil 40 for the latching member 39. When it is desired to connect the transformer in circuit manually, the switch 12 is closed in its lower position, thereby completing the circuit of the relay switch 11 through the switches 16 and 21 of the relays 14 and 15 between the positive and negative terminals of a circuit of control energy. The relay 11 is thereupon energized to connect the closing coil 6 to the source of control energy, and the interrupter 3 is closed and is latched in its closed position.

Immediately upon closure of the interrupter 3, its switch 8 closes to control the energization of two circuits. One circuit contains the operating coil of the closing coil relay 31 associated with the low-tension interrupter which thereupon operates to energize the closing coil 26 to close the interrupter 5. The other circuit contains the operating coil 18 of the cut-off relay 14 and is energized to actuate the cut-off relay to its biased position.

The switch 16 thereupon opens to open the circuit of both the operating coil 18 and the closing coil relay 11. The cut-off relay 14 remains in its biased position, however, to maintain the switch 16 open and, since the relay switch 11 is deenergized, the closing coil 6 is also deenergized.

Immediately upon the closure of the low-tension interrupter 5, the switch 28 closes to effect a similar operation of the cut-off relay 34 energizing the operating coil 38 to open the switch 36 and thereby deenergizing the closing coil relay switch 31. The high-tension interrupter 3 and the low-tension interrupter 5 are now both latched in closed position and their closing coils are deenergized.

In order to disconnect the transformer from the circuit, the switch 12 is closed in its upper position to energize the trip coil 7. The interrupter 3, upon opening, opens the circuit of the trip coil by means of the interlock switch 9. The switch 10, in closing, energizes two circuits, one of which contains the reset coil 20 and the switch 17 of the cut-off relay 14, and the other of which contains the trip coil 27 and the interlock switch 29 of the low-tension interrupter 5.

The energization of the reset coil 20 releases the cut-off relay 14 to permit the actuation thereof to its initial position, closing the switch 16 and opening the switch 17, thereby rendering the energizing circuit for the closing coil relay switch 11 available when it is desired to reclose the interrupter. The interlock switch 30 of the low-tension interrupter 5 similarly energizes reset coil 40 of the associated cut-off relay 34, whereupon the switch 36 is closed to permit subsequent energization of relay switch 31, when desired.

Similar disconnection of the transformer from the system may be automatically effected upon the occurrence of predetermined abnormal conditions, such as overload conditions, by means of an overload relay 41 which is energized from the circuit by a transformer 42. The relay 41 will operate to close its switch to energize the trip coil 7 of the high-tension interrupter 3. The interrupter will thereupon be opened, and the low-tension interrupter also will be subsequently opened, as previously explained.

Under certain conditions, it is desired to preclude further operation of the switching devices, especially where the system is automatically controlled and abnormal conditions of a persisting nature develop. As indicative of means responsive to any conditions of such character, I provide a relay 43, illustrated as one of a thermal type, that is energized in accordance with the heating of the transformer and operates to protect the same from overheating by opening the circuit interrupters and controlling the operation of the lock-out relay 15 when a dangerous temperature is attained. Since the lock-out relay 15 requires that it be reset by an attendant rather than by an operation of an automatic device, any abnormal conditions existing in the transformer or the associated apparatus must first be rectified by an attendant before the apparatus may be permitted to function automatically.

As I have specified before, I have illustrated the relay 43 as one that is responsive to a predetermined condition, namely, the temperature of the transformer, but desire it to be indicative, in its disposition here, of protective devices responsive to conditions of any character that are persistent in their nature, for example, devices providing differential protection and operative to detect internal faults in the transformer windings; devices responsive to the failure of operation of auxiliary cooling systems, such as water or air; and other similar conditions which are not transient in character.

In Fig. 2, I have illustrated a unit circuit system in which the transformed energy is supplied to a bus circuit 44 from which the energy is transferred to the feeder circuit 4 through a switching device 45. The switching device 45 comprises a closing coil 46, a trip coil 47 and three interlock switches 48, 49 and 50. An auxiliary relay switch 51 is provided to control the circuit of the closing coil 46. A cut-off relay 54 is also provided that is similar in construction and in operation to the relays 14 and 34 previously described. The relay 54 comprises two switching devices 56 and 57, an operating coil 58, a latch member 59 and a reset coil 60.

The operating coil of the relay switch 51 and the trip coil 47 that are associated with the switching device 45 are controlled by the interlock switches 28 and 30 of the switching device 5 in a manner similar to that previously described with respect to the operation of the switching devices 3 and 5. Thus, upon opening or closing the high-tension switching device 3, a corresponding operation of the switching device 5 is effected, and subsequently of the switch 45. While the switch 12 for controlling the energization of the closing coil and of the trip coil of the switching device 3 is illustrated as being manually operable, additional switching devices 61 and 62 may be provided that are automatically responsive to some predetermined condition upon the occurrence of which it is desired to effect either the energization or deenergization of the system.

My invention thus contemplates the automatic operation of several switching devices in sequence, each device effecting a corresponding operation of the next succeeding device in the sequence.

My invention is not limited to the specific devices that are illustrated or to the particular arrangement which I have shown, since they may be variously modified without departing from the spirit and scope of my invention, as set forth in the appended claims.

I claim as my invention:

1. In a transmission system, the combination with an energy-translating apparatus, of two circuit-controlling devices in separate circuits for connecting the apparatus to the system, and means independent of the system conductors whereby, upon the actuation of one circuit-controlling device, a similar operation is effected in the other device.

2. In a transmission system, the combination with an energy-translating apparatus, of two circuit-controlling devices in separate circuits for connecting the apparatus to the system, means associated with one device and independent of the system conductors for controlling the actuation of the other device in a similar manner and means for rendering said means inoperative after the actuation of each device.

3. In an electrical system, the combination with a translating device and a plurality of circuits connected thereto, of a circuit interrupter in each of said circuits, means for actuating each of said circuit interrupters to open or closed positions, means for controlling the actuating means of one of said circuit interrupters, and means independent of the system conductors and dependent only upon the actuation of said one of said circuit interrupters for controlling the actuating means of another of said circuit interrupters to effect a corresponding operation.

4. In an electrical system, the combination with a translating device and a plurality of circuits connected thereto, of a circuit interrupter in each of said circuits, means for closing each of said circuit interrupters, means for energizing the closing means of one of said circuit interrupters, and means independent of the system conductors and responsive only to the closing of said one of said circuit interrupters for effecting energization of the closing means of another of said circuit interrupters.

5. In an electrical system, the combination with a translating device and a plurality of circuits connected thereto, of a circuit interrupter in each of said circuits, means for tripping each of said circuit interrupters, means for energizing the tripping means of one of said circuit interrupters, and means independent of the system conductors and responsive only to the opening of said one of said circuit interrupters for effecting energization of the tripping means of another of said circuit interrupters.

6. In an electrical system, the combination with a translating device and a plurality of circuits connected thereto, of a circuit interrupter in each of said circuits, means for closing and means for tripping each of said circuit interrupters, means for energizing the closing and tripping means of one of said circuit interrupters, and means independent of the system conductors and responsive only to the actuation of said one of said circuit interrupters for controlling the energization of the closing and tripping means of another of said circuit interrupters to effect a similar actuation thereof.

7. A switching system for an electrical system containing a plurality of switching devices for connecting and disconnecting predetermined portions thereof, comprising means independent of the system conductors connecting the several switching devices whereby a predetermined operation of the first device in a predetermined sequence always effects a corresponding operation of the other devices in sequence and means for controlling the operation of the first device.

8. A switching system for an electrical system containing a plurality of switching devices for connecting and disconnecting predetermined portions thereof, means independent of the system conductors associated with the several devices for effecting similar operations thereof, means controlled by each device after a predetermined operation thereof for always controlling the corresponding operating means for the next device in sequence, and means for controlling the operating means for the first device.

9. A switching system for an electrical system containing a plurality of switching devices for connecting and disconnecting predetermined portions thereof, means independent of the system conductors associated with the several devices for effecting similar operations thereof, means controlled by each device after a predetermined operation thereof for always controlling the corresponding operating means for the next device in sequence to connect or disconnect the several portions of the system in the predetermined sequence.

In testimony whereof, I have hereunto subscribed my name this 14th day of April, 1923.

ALFRED J. A. PETERSON.